US011860841B2

(12) United States Patent
Hauck et al.

(10) Patent No.: US 11,860,841 B2
(45) Date of Patent: Jan. 2, 2024

(54) ONLINE IMPORT USING SYSTEM-VERSIONED TABLES

(71) Applicant: SAP SE, Walldorf (DE)

(72) Inventors: Ralf-Juergen Hauck, Heidelberg (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 63 days.

(21) Appl. No.: 17/650,125

(22) Filed: Feb. 7, 2022

(65) Prior Publication Data

US 2023/0252009 A1 Aug. 10, 2023

(51) Int. Cl.
*G06F 16/21* (2019.01)
*G06F 16/25* (2019.01)
*G06F 16/178* (2019.01)

(52) U.S. Cl.
CPC ........ *G06F 16/219* (2019.01); *G06F 16/1794* (2019.01); *G06F 16/256* (2019.01); *G06F 16/258* (2019.01)

(58) Field of Classification Search
CPC .... G06F 16/219; G06F 16/256; G06F 16/258; G06F 16/1794
See application file for complete search history.

(56) References Cited

U.S. PATENT DOCUMENTS

| 8,321,856 | B2 | 11/2012 | Auer et al. | |
|---|---|---|---|---|
| 8,566,814 | B2 | 10/2013 | Auer et al. | |
| 8,683,433 | B2 | 3/2014 | Nayak et al. | |
| 9,201,913 | B2 | 12/2015 | Hauck | |
| 10,055,215 | B2 | 8/2018 | Specht et al. | |
| 10,482,080 | B2 | 11/2019 | Auer et al. | |
| 10,621,167 | B2 | 4/2020 | Auer et al. | |
| 10,713,277 | B2 | 7/2020 | Auer et al. | |
| 10,740,318 | B2 | 8/2020 | Auer et al. | |
| 10,915,551 | B2 | 2/2021 | Hauck et al. | |
| 2012/0030312 | A1* | 2/2012 | Lehr | H04L 67/02 709/219 |
| 2014/0082156 | A1* | 3/2014 | Jagtap | G06F 9/5027 709/220 |
| 2014/0379650 | A1 | 12/2014 | Hauck | |
| 2019/0129986 | A1* | 5/2019 | Birn | G06F 16/217 |
| 2019/0129991 | A1* | 5/2019 | Auer | G06F 16/248 |
| 2020/0257673 | A1 | 8/2020 | Auer et al. | |

OTHER PUBLICATIONS

U.S. Appl. No. 16/688,941, Auer et al., filed Nov. 19, 2019.
Sap.com [online], "HANA System Versioned Tables" Nov. 2021, [retrieved on Feb. 4, 2022], retrieved from : URL <https://help.sap.com/viewer/6b94445c94ae495c83a19646e7c3fd56/2.0.04/en-US/91302b26f62c4433bbc58e0a951cdc1d.html>, 1 page.

* cited by examiner

*Primary Examiner* — Kris E Mackes
*Assistant Examiner* — Lin Lin M Htay
(74) *Attorney, Agent, or Firm* — Fish & Richardson P.C.

(57) ABSTRACT

Implementations include setting a session variable of each of a plurality of tenants to a first timestamp, importing, after the first timestamp, a first set of content to a shared container within a database system, during importing, each tenant in the plurality of tenants accessing pre-import data stored in the shared container based on the session variable being set to the first timestamp, and after importing the first set of content to the shared container, un-setting, at a second timestamp, the session variable of each of the plurality of tenants from the first timestamp, after the second timestamp, each tenant in the plurality of tenants accessing post-import data stored in the shared container.

20 Claims, 7 Drawing Sheets

ONLINE IMPORT USING SYSTEM-VERSIONED TABLES

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases provided in one or more database systems.

A multi-tenancy software architecture can include instances of a software application that runs on one or more servers and that serve multiple tenants. A tenant is an entity having multiple users that share a common access to a software instance. In a multi-tenant architecture, the software application can be designed to provide every tenant a dedicated share of an instance of the application. This can include tenant-specific data, configuration, user management, and tenant-specific functionality.

SUMMARY

Implementations of the present disclosure are directed to using versioned tables for online import of content. More particularly, implementations of the present disclosure are directed to using versioned tables to provide multiple content versions for content of tables in a shared container during import of content to a multi-tenant database system.

In some implementations, actions include setting a session variable of each of a plurality of tenants to a first timestamp, importing, after the first timestamp, a first set of content to a shared container within a database system, during importing, each tenant in the plurality of tenants accessing pre-import data stored in the shared container based on the session variable being set to the first timestamp, and after importing the first set of content to the shared container, un-setting, at a second timestamp, the session variable of each of the plurality of tenants from the first timestamp, after the second timestamp, each tenant in the plurality of tenants accessing post-import data stored in the shared container. Other implementations of this aspect include corresponding systems, apparatus, and computer programs, configured to perform the actions of the methods, encoded on computer storage devices.

These and other implementations can each optionally include one or more of the following features: importing, after the first timestamp, a first set of content to a shared container within a database system is executed in response to determining that the session variable of every tenant in the plurality of tenants has been set to the first timestamp; importing, after the first timestamp, a first set of content to a shared container within a database system comprises directly adding the first set of content into one or more tables already stored in the shared container prior to importing; the first set of content is associated with one or more timestamps within the one or more tables that are later than the first timestamp; an application server of a respective tenant sets the session variable to the first timestamp in response to a call from a management component; during a session, one or more transactions of a respective tenant access data in the shared container based on the session variable; and actions further include, after the second timestamp, importing a second set of content to respective tenant containers of the plurality of tenants within the database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to using versioned tables for online import of content. More particularly, implementations of the present disclosure are directed to using versioned tables to provide multiple content versions for content of tables in a shared container during import of content to a multi-tenant database system.

Implementations can include actions of setting a session variable of each of a plurality of tenants to a first timestamp, importing, after the first timestamp, a first set of content to a shared container within a database system, during importing, each tenant in the plurality of tenants accessing pre-import data stored in the shared container based on the session variable being set to the first timestamp, and after importing the first set of content to the shared container, un-setting, at a second timestamp, the session variable of each of the plurality of tenants from the first timestamp, after the second timestamp, each tenant in the plurality of tenants accessing post-import data stored in the shared container.

Figure 1:
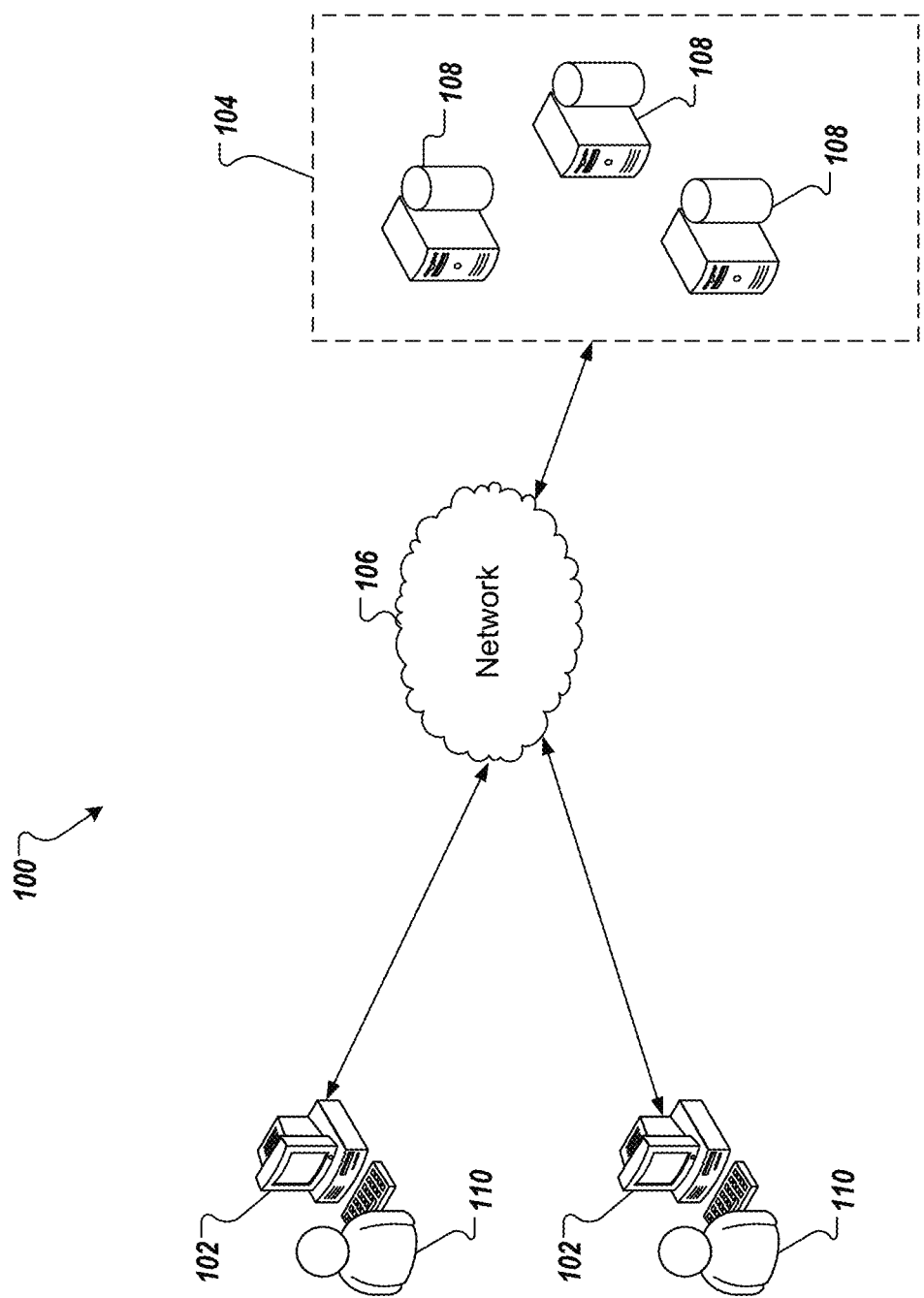
FIG. 1 depicts an example architecture that can be used to execute implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 110 can include a user, who interacts with an application that is hosted by the server system 104. In another example context, a user 110 can include a user, who interacts with the server system 104, as described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices, e.g., the client devices 102, over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes business applications that are executed in a client-server architecture, such as the example architecture 100 of FIG. 1. In some examples, business applications can be provided in a business suite that includes two or more business applications. Example business applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

As introduced above, a multi-tenancy architecture can include instances of a software application that runs on one or more servers and that serve multiple tenants. A tenant is an entity (e.g., a customer of the software vendor) having multiple users that share a common access to a software instance. In a multi-tenant architecture, the software application can be designed to provide every tenant a dedicated share of an instance of the application. This can include tenant-specific data, configuration, user management, and tenant-specific functionality. More particularly, in a multi-tenancy architecture, resources can be shared between applications from different tenants. Shared resources can include, for example, vendor code, application documentation, and central runtime and configuration data. Multi-tenancy can enable improved use of shared resources between multiple application instances, across tenants, which can reduce disk storage and processing requirements, among other advantages. Multi-tenancy can enable centralized software change management for events such as patching or software upgrades. For example, a database system that is accessed by the application instances includes a shared container that stores shared data, also referred to as shared content, and respective tenant containers, each tenant container storing tenant-specific data for a respective tenant. Example shared content can include, without limitation, report sources, dictionary metadata, help short-texts, and the like, which are the same for and accessed by all tenants. By storing shared content in a shared container, the memory is conserved (e.g., as opposed to providing a copy of the shared content in each tenant container).

During production use, content is sometimes deployed to the database system. For example, content can be shared content that is deployed to (imported to) a shared container (e.g., shared database). In some examples, content can also include content that is deployed to each tenant container (e.g., tenant database). However, previous approaches in deploying content causes disruptions to the tenants. For example, previous approaches require views in each tenant to be dropped and created or altered to facilitate tenant access to the new shared content. These actions are executed during the import of the tenant remaining parts through execution of data definition language (DDL) statements. However, execution of the DDL statements result in disruption of running database transactions in the tenant(s).

To illustrate such issues, a non-limiting example can be considered, in which a first tenant (T1) and a second tenant (T2) each access a shared container. In this example, the shared container stores a table that is named TAB #1. Although a single table is depicted for simplified illustration, it is contemplated that a shared container can store hundreds, even thousands of shared tables. As described herein, each table can include a versioned table, reading from which can be based on a timestamp setting. Being shared, TAB #1 is made read-only using a tabled view, named view TAB in this example, in each of respective tenant containers (e.g., a tenant container of T1, a tenant container of T2). Also in this example, each of T1 and T2 has access to a tenant-specific table, named TABA, that is stored locally in the respective tenant containers. That is, T1 has TABA stored in its tenant container and T2 has TABA stored in its tenant container. Being tenant-specific, T1 and T2 each have read and write access to TABA in the respective tenant containers. Hence, TABA of T1 can stored content that is different from TABA of T2. For example, T1 and T2 can each extend their respective TABA to modify TABA as originally provisioned (e.g., add fields).

In a previous approach to deploying content, an import process (e.g., executed by a deploy tool) includes creating a clone of TAB #1 in the shared container. For example, TAB #1 is copied and the copy is named TAB #2. The new shared content is deployed to TAB #2. For each tenant, the view TAB to TAB #1 is dropped, a view TAB to TAB #2 is created, and new content is deployed to TABA. However, during import (deployment), production use of each of the tenants continues, which can cause errors. For example, the drop/create of view TAB in a tenant container can cause a structured query language (SQL) error.

In further detail, a first transaction TX1 can be executing and can implicate reading of multiple tables and writing to some tables. In this example, the first transaction TX1 begins executing with auto-commit off within a tenant container, and can include:

TX1: SELECT * from TAB

Here, the first transaction TX1 reads data from the view TAB, which can include:

SELECT * FROM SHARED.SHARED.TAB #1

In short, the view TAB reads from the shared table TAB #1 in the shared container. Because the first transaction TX1 reads from the view TAB, the first transaction TX1, in effect, reads from the shared table TAB #1 in the shared container. The first transaction TX1 is successful and results in reading a snapshot of the shared table.

A second transaction TX2 is executed as part of a process running an import of content to the tenant. The second transaction TX2 can include, for example:

DROP VIEW TAB
CREATE VIEW TAB AS SELECT * FROM SHARED-
.SHARED.TAB #2

Accordingly, the view TAB is now set to read from TAB #2, which includes the cloned and imported content. However, the dependent views of the newly created view must be validated by the database system before use to ensure consistency (e.g., if any field selected by the dependent view is no longer available in the newly created view).

As part of on-going production use, the first transaction TX1 executes again, but prior to all dependent view being validate after the view TAB being re-created (i.e., the view TAB now reading from TAB #2). As a result, the first transaction TX1 fails, within the transaction the previous definition of TAB (reading from TAB #1) was used and snapshots/caches in the tenant of TAB #1 content cannot be updated with further content because the definition of the view TAB has been dropped (i.e., the previous view TAB (to TAB #1) was dropped). Further, the content of TAB #2 is different from TAB #1. This all can result in a SQL error (e.g., that dependent views are invalid, or that data cannot be read from TAB #1).

In view of the foregoing, and as introduced above, implementations of the present disclosure are directed to using versioned tables for online import of content. More particularly, implementations of the present disclosure are directed to using versioned tables to provide multiple content versions for content of tables in a shared container during import of content to a multi-tenant database system. In the context of the present disclosure, online import refers to import of new content (e.g., shared content, tenant-specific content) to a database system during production use of the database system. That is, the database system is not taken offline to execute the import. This can occur, for example, in instances of patches being deployed to the database system, which can be required to be deployed, while the database system is online and in production use (e.g., emergency patch procedure).

In accordance with implementations of the present disclosure, and as described in further detail herein, versioned tables are used to enable transition from old content to new content on a transaction-by-transaction basis, such that each transaction executes on consistent content. That is, in terms of the data that a transaction executes on, the transaction has a consistent start and a consistent finish. The switch to new content is done at a transaction end individually for every transaction. In this manner, implementations of the present disclosure avoid a hard switch to newly deployed content across all transaction, which can result in errors (e.g., SQL errors introduced above).

In further detail, each versioned table provides a respective content version for the content of the tables in the shared container. In some implementations, a first versioned table can provide upon select data which corresponds to a first timestamp (ts1) and using a different configuration at the select or session can provide upon a second select data which corresponds to a second timestamp (ts2). The first timestamp corresponds to shared content before the import begins, which can be referred to as pre-import version of shared content. In this manner, tenant transactions are not disrupted by the import to the shared container. Also, the import to the tenant(s) happens after import to the shared container and reading content of two different versions can lead to any kind of unexpected behavior. The second timestamp corresponds to completion of the import is complete (i.e., both to the shared container and the tenant containers). Accordingly, the second timestamp corresponds to shared content after the import is complete, which can be referred to as post-import version of shared content.

As described in further detail herein, each of the tenants is configured to read content associated with session variable indicating a time. In some examples, the session variable is un-set, which indicates that transactions are to read the "latest" (i.e., most recent) data from the shared content. In accordance with implementations of the present disclosure, the session variable is set to ensure that transactions only access data of the pre-import shared content during execution of the import process to the shared container. That is, for example, the session variable is set to the first timestamp indicating that "latest" is the first timestamp (i.e., only data on or before the first timestamp is accessed). In this manner, transactions staring before the import begins, or starting while the import is ongoing only access the pre-import version of shared content. At completion of the import, the session variable is un-set, which again indicates that transactions are to read the "latest" (i.e., most recent) data from the shared content. At this point, the "latest" data is that of the post-import version of shared content.

Figure 2A:
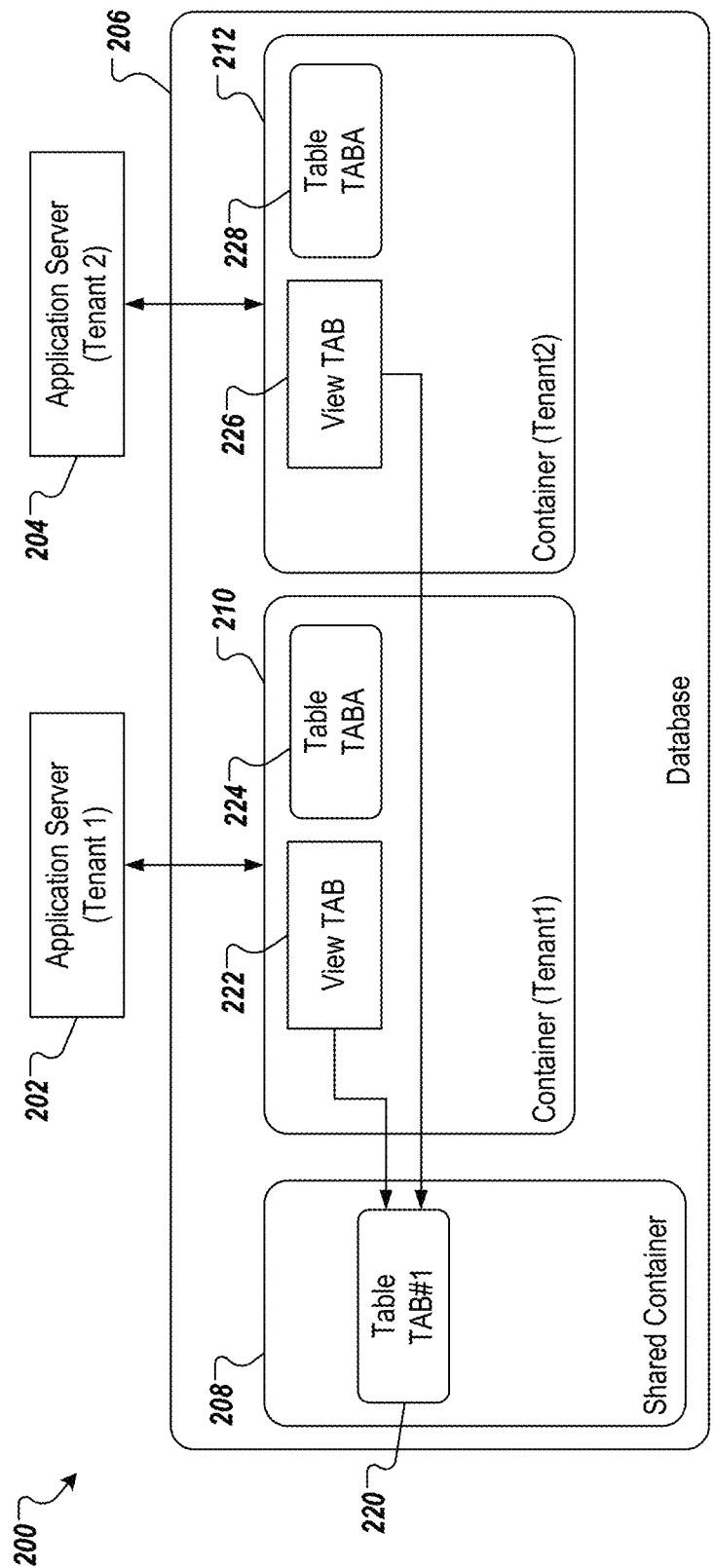
FIGS. 2A-2C depicts an example progression of online import using versioned tables in accordance with implementations of the present disclosure.
Figure 2B:
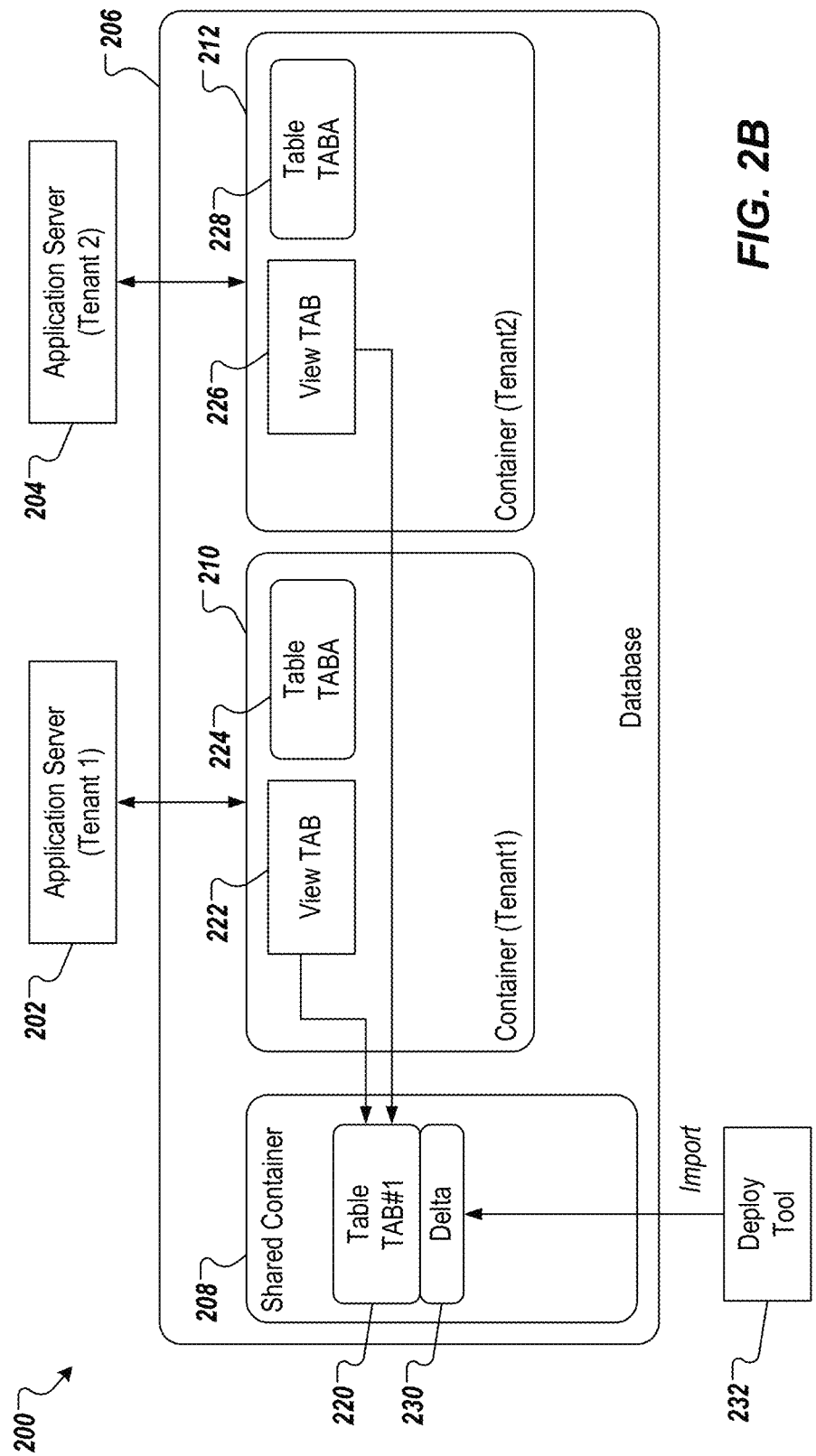
Figure 2C:
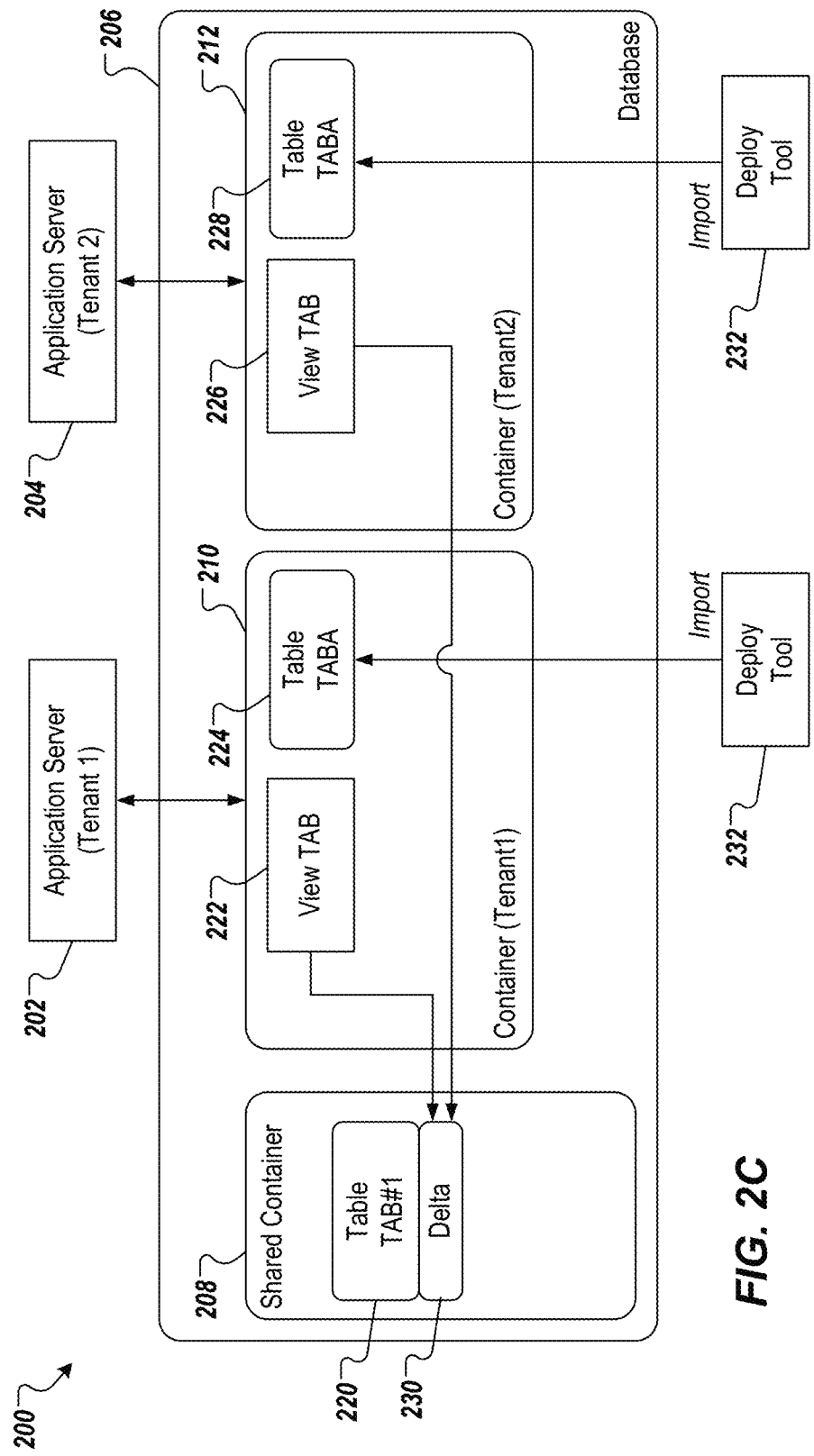

FIGS. 2A-2C depicts an example progression of online import using versioned tables in accordance with implementations of the present disclosure.

With particular reference to FIG. 2A, an example system 200 is depicted and is a simplified, non-limiting representation of a multi-tenant system that includes application servers 202, 204, and a database system 206. In the example of FIG. 2, the database system 206 includes a shared container 208 and tenant containers 210, 212. The tenant container 210 corresponds to a first tenant (Tenant1) and the tenant container 212 corresponds to a second tenant (Tenant2). Although a single shared container is depicted, it is contemplated that implementations of the present disclosure can be realized in database systems having multiple shared containers. Also, while two tenant containers are depicted, it is contemplated that implementations of the present disclosure can be realized in database systems having any appropriate number of tenant containers.

In some examples, each of the application servers 202, 204 executes a respective instance of a multi-tenant application for a respective tenant. For example, the application server 202 executes an application instance for the first tenant and communicates with (e.g., issues queries to) the tenant container 210, and the application server 204 executes an application instance for the second tenant and communicates with (e.g., issues queries to) the tenant container 212. In some examples, queries issued by the application instances implicate shared content and/or tenant-specific content.

With continued reference to FIG. 2A, the shared container 208 stores shared content 220. In the example of FIG. 2A, the shared content 220 is stored in a table having the name TAB #1, which is configured to be a versioned table, as discussed above. In this manner, the data of the shared content 220 can be read for any given timestamp. That is, for example, it can be specified to read content version at a first timestamp before the import of new content or to read the content version at a second timestamp after the import of the delta. The timestamp indicating when the data was added to or last modified the shared content 220. The tenant container 210 includes a view 222 and tenant-specific content 224, and the tenant container 212 includes a view 226 and tenant-specific content 228. Each of the views 222 and the view 226 is a view to the shared content 220. Each of the tenant-specific content 224, 228 is stored in respective tables (e.g., with table name TABA).

The example of FIG. 2A depicts operation of the system 200 prior to import of content to the shared container 208 and/or the tenant containers 210, 212. In some examples, a session variable that indicates a time associated with shared content that is accessible is un-set, which results in sessions accessing the most recent (i.e., the latest) data in the shared content 220. In some examples, a session is established between an application server (e.g., the application server 202, the application server 204) and a database system (e.g., the database system) and, during the session, the application transmits queries to and receives results from the database system (e.g., as part of one or more transactions). Each session is associated with a session variable, as described herein. An example session variable is provided as:

TEMPORAL_SYSTEM_TIME_AS_OF which indicates a time associated with shared content that is accessible to transactions. Prior to triggering an import, the session variable, for sessions across all tenants, is un-set, which, by default, indicates that the most recent (i.e., the latest) data in the shared content 220 is accessible.

In some implementations, a management component (not depicted) can be used to manage the application. An example management component is Service Provider Cockpit (SPC) provided by SAP SE of Walldorf, Germany. In general, the management component enables lifecycle management of applications, which can include, for example, orchestrating deployments of new content. In some examples, the management component (e.g., in response to prompting by a user) determines a cluster that the content is to be deployed to. In some examples, a cluster includes one or more shared containers and a set of tenant containers that read from the shared container(s), which the content is deployed to. A current timestamp (<utc_ts1>) is determined (e.g., as the first timestamp (ts1). The management component loops over all tenants in the cluster and, for each tenant, calls the tenant and passes the first timestamp to prompt the tenant to set the session variable to the first timestamp. For example:

SET [SESSION] 'TEMPORAL_SYSTEM_TIME_AS_OF'='<utc_ts1>'

In response, the tenant sets its session variable to the first timestamp. For example, the respective application server sets the session variable to the first timestamp. In this manner, any executing transactions (i.e., transaction in-progress prior to setting the session variable) access the "latest" data in the shared content, which is anyway data that was included in the shared content at or prior to the first timestamp. Similarly, any transactions that begin after the first timestamp, will only access data that was included in the shared content at or prior to the first timestamp. In some examples, each application server also invalidates a prepared statement cache, which ensures that any transactions that begin after the first timestamp, will only access data that was included in the shared content at or prior to the first timestamp. In some examples, the prepared statement cache stores statements (e.g., SQL statements) of previously submitted transactions.

In some implementations, the management component waits a pre-determined amount of time, after which all sessions in the cluster have set the session variable. The pre-determined amount of time can be a maximum-runtime for a session that is set within the system. Accordingly, upon expiration of the pre-determined amount of time, the session variable is determined to be set for all sessions in the cluster. In some implementations, each application server is configured to notify the management component as to setting of the session variable. Accordingly, upon reporting of all application servers in the cluster, the session variable is determined to be set for all sessions in the cluster. After the session variable is set for all sessions, all tenants read from the shared container with the first timestamp, and all subsequent changes to the shared container are not visible to the tenants, until the session variable is again modified.

After the session variable is set for all sessions, the management component calls a deployment tool to deploy the new content to the shared container. An example deployment tool includes R3trans provided by SAP SE. In some examples, the call includes or otherwise indicates the content that is to be imported (deployed) to the shared container, as well as the shared container. In response to the call, the deployment tool imports the content directly to the implicated table(s) within the shared container. That is, instead of cloning tables and adding the content to cloned tables, the content is directly added to the existing tables. In some examples, the deployment tool records which tables have received content as well as a timestamp of when the tables received with content.

This deployment is depicted in FIG. 2B, which includes a delta 230 and a deployment tool 232. Here, the delta 230 represents a post-import version of the shared content 220 (i.e., content that is imported after <utc_ts1>). In response to the call from the management component, the deploy tool 232 imports the content directly to the shared content 220 (i.e., TAB #1 in the example of FIG. 2B), the imported content being represented by the delta 230. At this state, the shared container 220 includes the delta (i.e., content change), but the tenant containers only read the pre-import version of the shared content (i.e., data associated with a timestamp that is equal to or earlier than <utc_ts1>).

In some implementations, the delta 230 (i.e., the post-import version of the shared content 220) is made visible to the tenant containers 210, 212 by un-setting the session variable for each of the tenants. For example, the session variable is un-set by deleting the first timestamp from the configuration. In some examples, the management component loops over all tenants in the cluster and, for each tenant, calls the tenant to prompt the tenant to un-set the session variable. For example:

UNSET [SESSION] 'TEMPORAL_SYSTEM_TIME_AS_OF'

In response, the tenant unsets its session variable. For example, the respective application server unsets the session variable. In this manner, any executing transactions (i.e., transaction in-progress prior to un-setting the session variable) access the "latest" data in the shared content, which is anyway data that was included in the shared content at or prior to a second timestamp (i.e., the time at which the session variable is un-set). Similarly, any transactions that begin after the second timestamp, will only access data that was included in the shared content after to the second timestamp (i.e., the post-import version of the shared content). In some examples, each application server also invalidates a prepared statement cache, which ensures that any transactions that begin after the second timestamp, will only access data that was included in the shared content after the second timestamp.

In some implementations, the session variable is un-set at the tenants prior to and/or during deployment of content to the tenants (e.g., to the tenant-specific tables). In this manner, deployment of content to tenants can be coordinated with respective tenants. That is, the deployment of content to tenants need not be synchronous. For example, each tenant can determine when content is to be deployed to their respective tenant container.

This is depicted in FIG. 2C, which includes the views 222, 226 reading from the delta 230 and the deploy tool 232 importing content to the tenant container 210 and the tenant container 212 (e.g., at different times).

Figure 3:
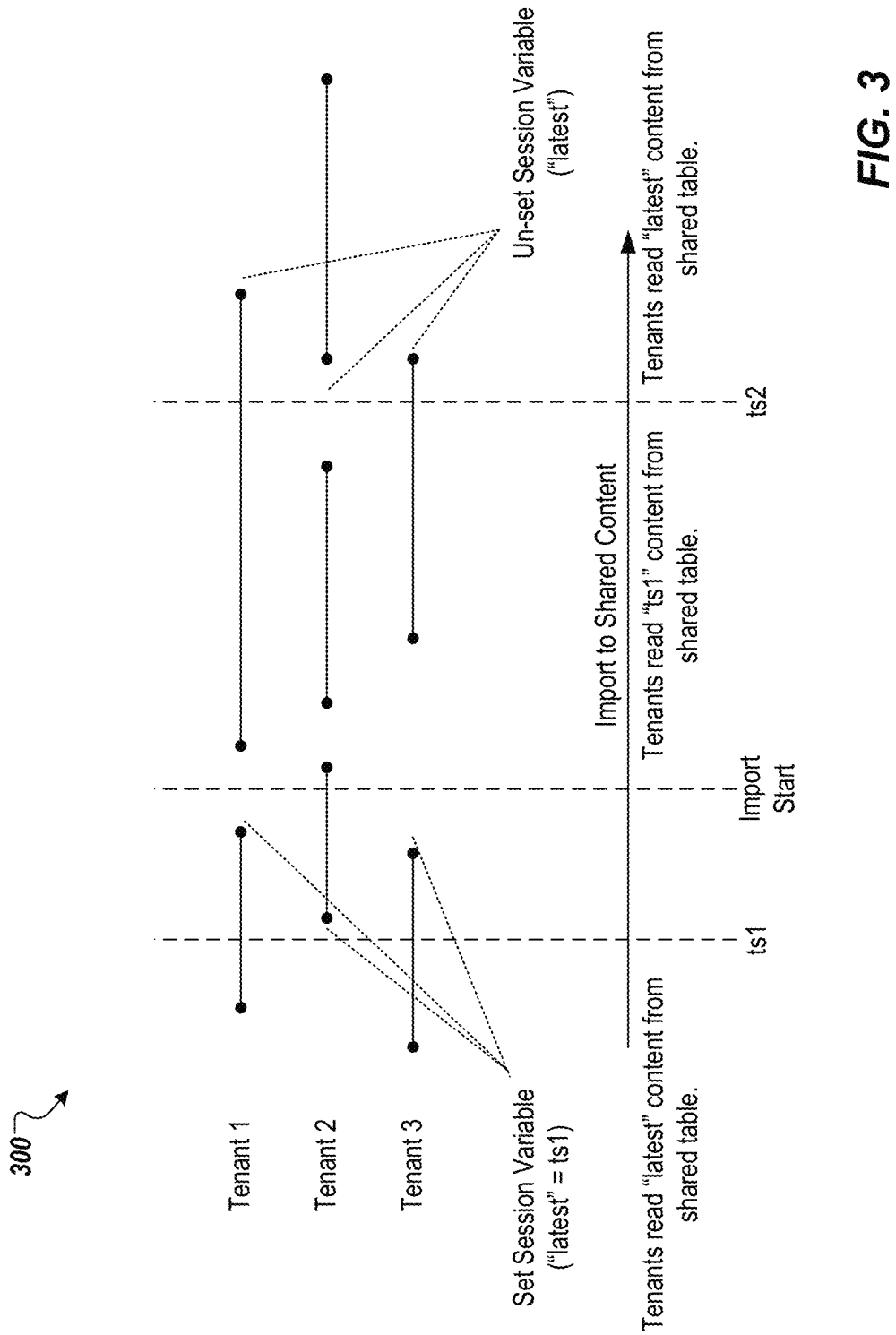
FIG. 3 depicts an example timeline of online import using versioned tables in accordance with implementations of the present disclosure.

FIG. 3 depicts an example timeline 300 of online import using versioned tables in accordance with implementations of the present disclosure. The example timeline 300 includes a first timestamp (ts1), a second timestamp (ts2), and transactions of multiple tenants (Tenant 1, Tenant 2, Tenant 3). In the example of FIG. 3, prior to executing deployment, the session variable of all tenants is set to the first timestamp (e.g., <utc_ts1>). That is, after the first timestamp, the session variable is set for any tenant that does not have an executing transaction (e.g., Tenant 2), and is set for tenants after executing transactions complete (e.g., Tenant 1, Tenant 3). As described in detail herein, after all tenants set the session variable, online import of content to the shared content is executed. This can last until the second timestamp, at which point, the session variable of all tenants is un-set, as described in detail herein. That is, after the second timestamp, the session variable is set for any tenant that does not have an executing transaction (e.g., Tenant 2), and is set for tenants after executing transactions complete (e.g., Tenant 1, Tenant 3). More particularly, any tenants having transactions that begin prior to the second timestamp and are still executing will have their session variable unset after the executing transactions complete.

Figure 4:
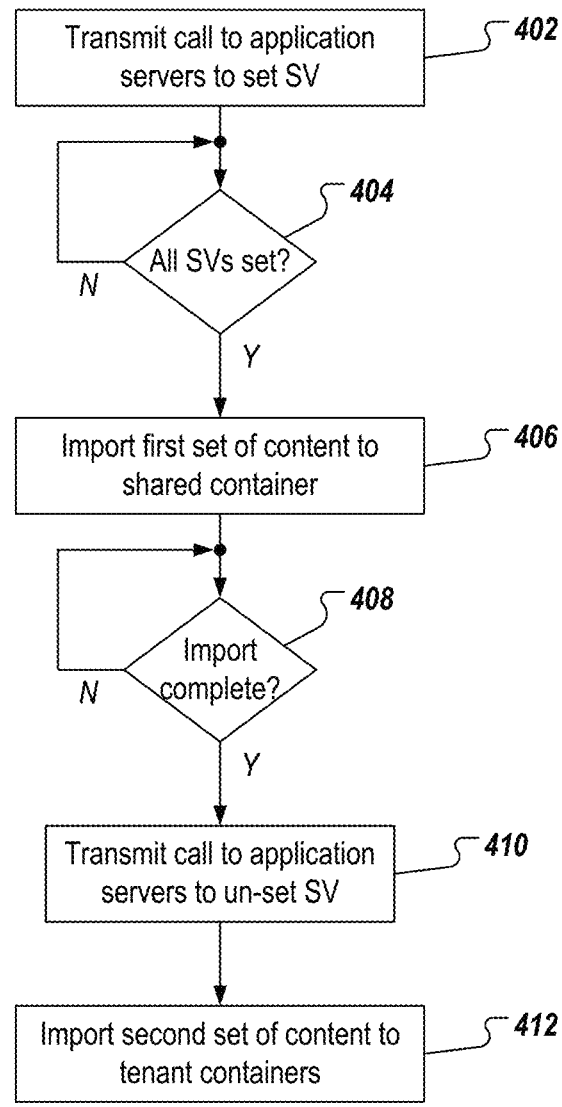
FIG. 4 depicts an example process that can be executed in accordance with implementations of the present disclosure.

FIG. 4 depicts an example process 400 that can be executed in accordance with implementations of the present disclosure. The example process 400 can be executed by one or more computer-executable programs.

A call is transmitted to application servers to set a session variable (402). For example, and as described herein, a management component (e.g., in response to prompting by a user) determines a cluster that content is to be deployed to, the cluster including specified application servers. The management component loops over all tenants in the cluster and, for each tenant, calls the tenant and passes a first timestamp to prompt the tenant to set the session variable to the first timestamp. In response, each tenant (application server of each tenant) sets its session variable to the first timestamp.

It is determined whether the session variable of all application servers has been set (404). In some examples, and as described herein, the management component waits a pre-determined amount of time, after which all sessions in the cluster have set the session variable. The pre-determined amount of time can be a maximum-runtime for a session that is set within the system. Accordingly, upon expiration of the pre-determined amount of time, the session variable is determined to be set for all sessions in the cluster. In some examples, and as described in detail herein, each application server is configured to notify the management component as to setting of the session variable. Accordingly, upon reporting of all application servers in the cluster, the session variable is determined to be set for all sessions in the cluster. After the session variable is set for all sessions, all tenants read from the shared container with the first timestamp, and all subsequent changes to the shared container are not visible to the tenants, until the session variable is again modified.

A first set of content is imported to a shared container (406). For example, and as described in detail herein, after the session variable is set for all sessions, the management component calls a deployment tool to deploy the new content to the shared container. In response to the call, the deployment tool imports the content directly to the implicated table(s) within the shared container. That is, instead of cloning tables and adding the content to cloned tables, the content is directly added to the existing tables. In some examples, the deployment tool records which tables have received content as well as a timestamp of when the tables received with content.

It is determined whether the import is complete (408). For example, the deployment tool can provide an indication to the management component, the indication indicating that the import is complete. Upon completion of the import, a call is transmitted to the application servers to unset the session variable (410). For example, the session variable is un-set by deleting the first timestamp from the configuration. In some examples, the management component loops over all tenants in the cluster and, for each tenant, calls the tenant to prompt the tenant to un-set the session variable. A second set of content is imported to tenant containers (412). For example, tenant-specific content is imported to one or more tenant containers.

Figure 5:
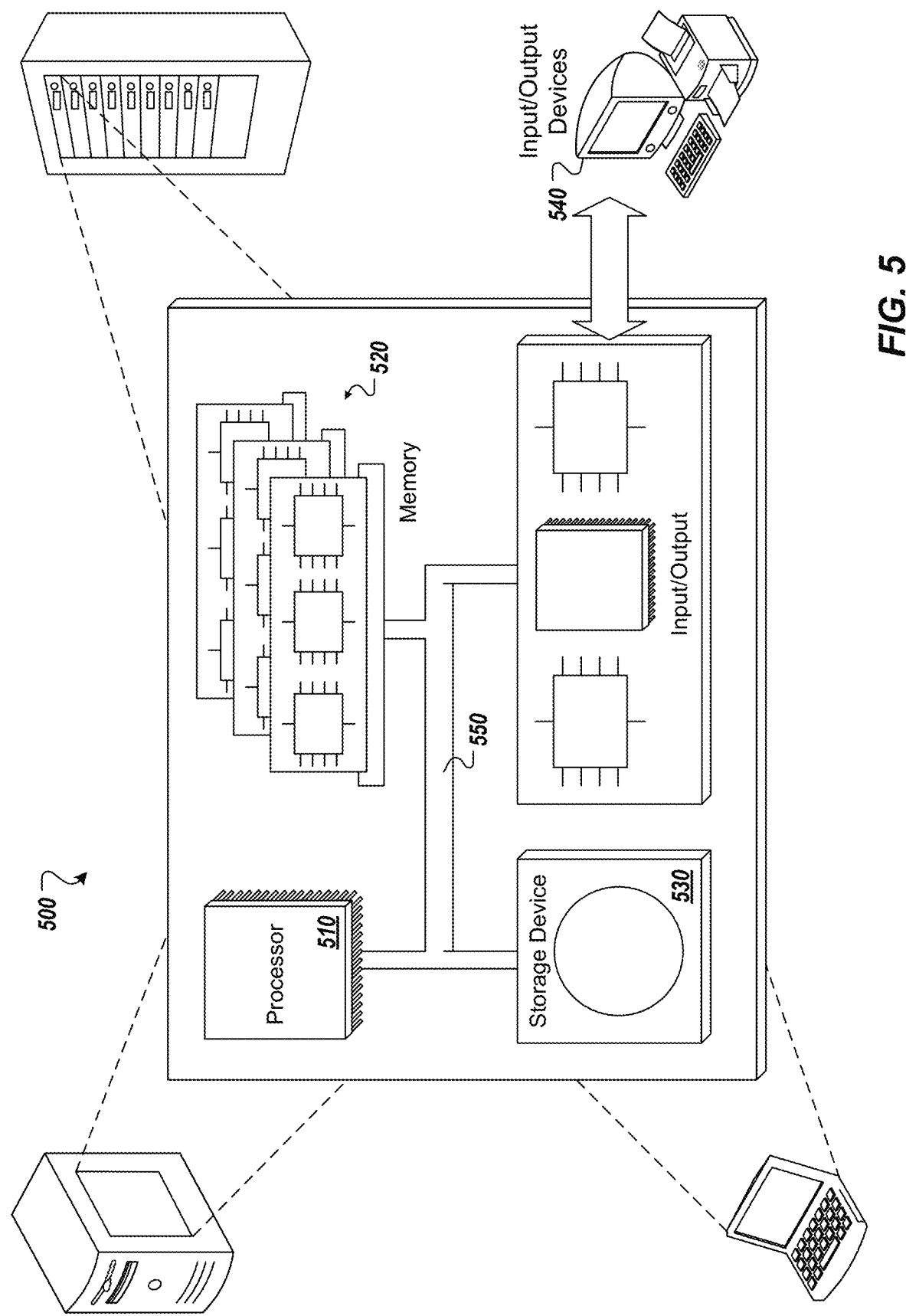
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for online import of content to a database system, the method being executed by one or more processors and comprising:
   setting a session variable in respective sessions of each of a plurality of tenants with the database system to a first timestamp, the session variable limiting shared content of a shared container that is accessible to all tenants of the plurality of tenants during the respective sessions, the shared container comprising storage for storing shared content accessible by each tenant in the plurality of tenants;
   importing, after the first timestamp, a first set of content to the shared container within a database system, during importing, each tenant in the plurality of tenants accessing pre-import data stored in the shared container based on the session variable being set to the first timestamp; and
   after importing the first set of content to the shared container, un-setting, at a second timestamp, the session variable of each of the plurality of tenants from the first timestamp, after the second timestamp, each tenant in the plurality of tenants accessing post-import data stored in the shared container.

2. The method of claim 1, wherein importing, after the first timestamp, a first set of content to a shared container within a database system is executed in response to determining that the session variable of every tenant in the plurality of tenants has been set to the first timestamp.

3. The method of claim 1, wherein importing, after the first timestamp, a first set of content to a shared container within a database system comprises directly adding the first set of content into one or more tables already stored in the shared container prior to importing.

4. The method of claim 3, wherein the first set of content is associated with one or more timestamps within the one or more tables that are later than the first timestamp.

5. The method of claim 1, wherein an application server of a respective tenant sets the session variable to the first timestamp in response to a call from a management component.

6. The method of claim 1, wherein, during a session, one or more transactions of a respective tenant access data in the shared container based on the session variable.

7. The method of claim 1, further comprising, after the second timestamp, importing a second set of content to respective tenant containers of the plurality of tenants within the database system.

8. A non-transitory computer-readable storage medium coupled to one or more processors and having instructions stored thereon which, when executed by the one or more processors, cause the one or more processors to perform operations for online import of content to a database system, the operations comprising:
    setting a session variable in respective sessions of each of a plurality of tenants with the database system to a first timestamp, the session variable limiting shared content of a shared container that is accessible to all tenants of the plurality of tenants during the respective sessions, the shared container comprising storage for storing shared content accessible by each tenant in the plurality of tenants;
    importing, after the first timestamp, a first set of content to the shared container within a database system, during importing, each tenant in the plurality of tenants accessing pre-import data stored in the shared container based on the session variable being set to the first timestamp; and
    after importing the first set of content to the shared container, un-setting, at a second timestamp, the session variable of each of the plurality of tenants from the first timestamp, after the second timestamp, each tenant in the plurality of tenants accessing post-import data stored in the shared container.

9. The non-transitory computer-readable storage medium of claim 8, wherein importing, after the first timestamp, a first set of content to a shared container within a database system is executed in response to determining that the session variable of every tenant in the plurality of tenants has been set to the first timestamp.

10. The non-transitory computer-readable storage medium of claim 8, wherein importing, after the first timestamp, a first set of content to a shared container within a database system comprises directly adding the first set of content into one or more tables already stored in the shared container prior to importing.

11. The non-transitory computer-readable storage medium of claim 10, wherein the first set of content is associated with one or more timestamps within the one or more tables that are later than the first timestamp.

12. The non-transitory computer-readable storage medium of claim 8, wherein an application server of a respective tenant sets the session variable to the first timestamp in response to a call from a management component.

13. The non-transitory computer-readable storage medium of claim 8, wherein, during a session, one or more transactions of a respective tenant access data in the shared container based on the session variable.

14. The non-transitory computer-readable storage medium of claim 8, wherein operations further comprise, after the second timestamp, importing a second set of content to respective tenant containers of the plurality of tenants within the database system.

15. A system, comprising:
    a computing device; and
    a computer-readable storage device coupled to the computing device and having instructions stored thereon which, when executed by the computing device, cause the computing device to perform operations for online import of content to a database system, the operations comprising:
        setting a session variable in respective sessions of each of a plurality of tenants with the database system to a first timestamp, the session variable limiting shared content of a shared container that is accessible to all tenants of the plurality of tenants during the respective sessions, the shared container comprising storage for storing shared content accessible by each tenant in the plurality of tenants;
        importing, after the first timestamp, a first set of content to the shared container within a database system, during importing, each tenant in the plurality of tenants accessing pre-import data stored in the shared container based on the session variable being set to the first timestamp; and
        after importing the first set of content to the shared container, un-setting, at a second timestamp, the session variable of each of the plurality of tenants from the first timestamp, after the second timestamp, each tenant in the plurality of tenants accessing post-import data stored in the shared container.

16. The system of claim 15, wherein importing, after the first timestamp, a first set of content to a shared container within a database system is executed in response to determining that the session variable of every tenant in the plurality of tenants has been set to the first timestamp.

17. The system of claim 15, wherein importing, after the first timestamp, a first set of content to a shared container within a database system comprises directly adding the first set of content into one or more tables already stored in the shared container prior to importing.

18. The system of claim 17, wherein the first set of content is associated with one or more timestamps within the one or more tables that are later than the first timestamp.

19. The system of claim 15, wherein an application server of a respective tenant sets the session variable to the first timestamp in response to a call from a management component.

20. The system of claim 15, wherein, during a session, one or more transactions of a respective tenant access data in the shared container based on the session variable.

* * * * *